July 20, 1943.  E. WIEDMANN  2,324,750
CONTROL FOR HYDRODYNAMIC MACHINES
Filed Sept. 14, 1938  2 Sheets-Sheet 1
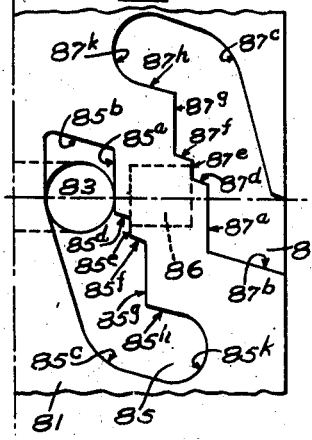
INVENTOR.
ERNST WIEDMANN
BY
ATTORNEY.

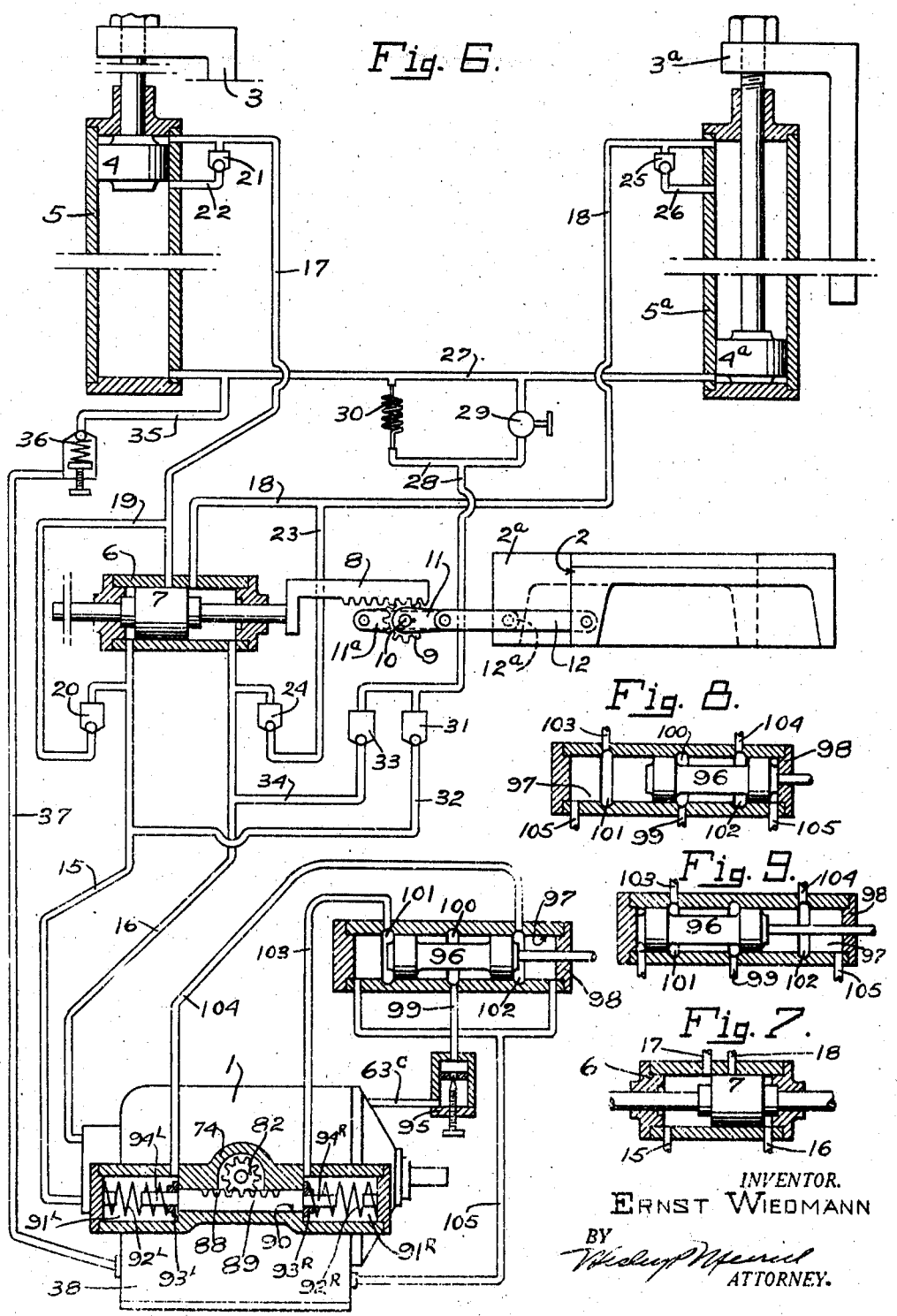

Patented July 20, 1943

2,324,750

UNITED STATES PATENT OFFICE 2,324,750

CONTROL FOR HYDRODYNAMIC MACHINES

Ernst Wiedmann, Milwaukee, Wis., assignor to The Oilgear Company, Milwaukee, Wis., a corporation of Wisconsin Application September 14, 1938, Serial No. 229,825

20 Claims. (Cl. 121—41)

This invention relates to controls for hydrodynamic machines of the type which function as pumps when driven from a source of power and function as motors when supplied with motive liquid.

The principal object of the invention is to provide a control by means of which the displacement of a hydrodynamic machine may be varied according to a predetermined schedule to thereby cause the volumetric delivery of said machine when functioning as a pump or the speed of said machine when functioning as a motor to vary according to such schedule.

Other and more specific objects and advantages will appear from the description hereinafter given of apparatus in which the invention is embodied.

Since the functions of a pump and the functions of a motor are substantially opposite to each other, the invention will be explained as applied to a hydrodynamic machine which is to function as a pump but it is to be understood that the invention is equally applicable to a motor and that the term "pump" as used herein is intended to cover either a pump or a motor or a hydrodynamic machine which may function as either a pump or a motor.

The invention is exemplified by the apparatus shown somewhat schematically in the accompanying drawings in which the views are as follows:

Fig. 1 is a transverse vertical section through a pump to which the invention has been applied.

Fig. 2 is a view showing on a larger scale a part of the mechanism illustrated in Fig. 1.

Fig. 3 is a developed top plan view of a part of a rotary valve forming a part of the invention, the view being taken in the plane of the line 3—3 of Fig. 2.

Figs. 4 and 5 are views similar to Fig. 3 but showing the valve rotated to positions different from that shown in Fig. 3.

Fig. 6 is a circuit diagram showing the invention applied to a pump which is employed to energize the motors of a hydraulically operated broaching machine.

Fig. 7 is a view showing one of the motors of the broaching machine with its piston in a position different from that shown in Fig. 6.

Figs. 8 and 9 are views showing a control valve in positions different from that shown in Fig. 6.

For the purpose of illustration, the invention has been shown as being applied to a pump I and the pump has been shown in Fig. 6 as being employed to drive a broaching machine having work and tool carriages which must be operated in a predetermined sequence. Since the broaching machine is fully illustrated and described in Patent No. 2,190,642, it has been represented by a schematic showing of its hydraulic circuit.

It is deemed sufficient to state herein that the machine has a work slide 2 for advancing and retracting a piece of work into and out of the path of a broaching tool carried by a tool slide 3 which is reciprocated vertically by a piston 4 arranged in a stationary cylinder 5, and a work slide $2^a$ for advancing and retracting another piece of work into and out of the path of a broaching tool carried by a tool slide $3^a$ which is reciprocated vertically by a piston $4^a$ arranged in a stationary cylinder $5^a$.

Work slides 2 and $2^a$ are both reciprocated by a hydraulic motor consisting of a cylinder 6 and a piston 7 which is fitted in cylinder 6 and functions both as a motor piston and as a valve. A rack 8 is connected to piston 7 and in mesh with a pinion 9 fixed upon a shaft 10 which is rotatable upon a stationary axis and has two levers or arms 11 and $11^a$ fixed thereon. Arms 11 and $11^a$ are spaced 180 degrees apart and connected, respectively, to work slides 2 and $2^a$ by links 12 and $12^a$.

The arrangement is such that, when piston 7 is moved toward the right, rack 8 will rotate pinion 9 and shaft 10 in a clockwise direction and cause arms 11 and $11^a$ and links 12 and $12^a$ to advance slide 2 and retract slide $2^a$ and, when piston 7 is moved toward the left, rack 8 will rotate pinion 9 and shaft 10 in a counterclockwise direction and cause arms 11 and $11^a$ and links 12 and $12^a$ to advance slide $2^a$ and retract slide 2.

The parts are so proportioned that the stroke of motor 6—7 is just enough to rotate shaft 10 through substantially 180° and, when piston 7 is at either end of its strokes the axis of shaft 10 and the pivot points of links 12 and $12^a$ are in a straight line parallel to the path of slides 2 and $2^a$ so that the thrust of the tool against the work on either slide will impart substantially no turning moment to shaft 10.

Liquid for operating motors 4—5, $4^a$—$5^a$ and 6—7 is supplied by pump 1 which may either be reversible or the flow of liquid in the circuit may be reversed through a valve to reverse the motor. As shown, pump 1 is reversible and adapted to deliver liquid into one and receive liquid from the other of two channels 15 and 16 which are connected to cylinder 6 at or near the extreme ends thereof.

Channels 15 and 16 are adapted to communicate, respectively, with two channels 17 and 18 which have the adjacent ends thereof spaced from each other and connected to cylinder 6 intermediate the ends thereof. The arrangement is such that, when piston 7 is in the position shown in Fig. 6, channel 17 is blocked and channel 18 is open to channel 16 and, when piston 7 is shifted to the position shown in Fig. 7, channel 18 will be blocked and channel 17 will be open to channel 15.

The other ends of channels 17 and 18 are connected, respectively, to the upper ends of cylinders 5 and 5ª. Channel 17 is also connected through a channel 19 and a check valve 20 to channel 15 intermediate the ends thereof and through a check valve 21 and a channel 22 to cylinder 5 at a point which is just below piston 4 when piston 4 is in its uppermost position. Check valves 20 and 21 permit liquid to flow from cylinder 5 through channels 22, 17 and 19 into channel 15 but prevent it from flowing in the opposite direction.

Channel 18 is likewise connected through a channel 23 and a check valve 24 to channel 16 intermediate the ends thereof and through a check valve 25 and a channel 26 to cylinder 5ª at a point which is just below piston 4ª when piston 4ª is in its uppermost position. Check valves 24 and 25 permit liquid to flow from cylinder 5ª through channels 26, 18 and 23 into channel 16 but prevent it from flowing in the opposite direction.

Cylinders 5 and 5ª have the lower ends thereof connected to each other by a channel 27 which is connected to a channel 28 through a manually operated shutoff valve 29 and choke 30. Channel 28 is connected through a check valve 31 and a channel 32 to channel 15 and through a check valve 33 and a channel 34 to channel 16. Channel 27 is also connected through a channel 35 to a relief valve 36 which discharges through a channel 37 into a reservoir 38 which is ordinarily formed in the casing of pump 1 and from which pump 1 is supplied with motive liquid.

The arrangement is such that, when the parts are in the positions shown in Fig. 6 and pump 1 is caused to deliver liquid into channel 15, the liquid will enter the left end of cylinder 6 and move piston 7 toward the right, thereby causing slide 2 to be advanced and move the work thereon into the path of a tool carried by slide 3 and causing slide 2ª to be retracted and move the work thereon out of the path of a tool carried by slide 3ª.

As soon as piston 7 moves a short distance, it blocks channel 18 and, when it reaches the end of its movement, it uncovers the end of channel 17. Liquid from pump 1 may then flow through channel 15, cylinder 6 and channel 17 to the upper end of cylinder 5 and move piston 4 downward on a working stroke, thereby moving tool slide 3 downward and causing the tool thereon to take a cut from the work on slide 2.

As piston 4 moves downward, it ejects liquid from the lower part of cylinder 5, and this liquid flows through channel 27 to the lower end of cylinder 5ª and raises piston 4ª, thereby causing tool slide 3ª to move upward simultaneously with the downward movement of tool slide 3. Piston 4ª in moving upward will eject liquid from the upper part of cylinder 5ª through channels 18 and 23 and check valve 24 into channel 16 which at this time constitutes the return channel to pump 1.

Since the displacement of cylinders 5 and 5ª are the same, the liquid ejected from cylinder 5 tends to move piston 5ª upward at practically the same rate as piston 4 moves downward but at the same time, liquid will flow from channel 15 through channel 32, check valve 31, channel 28, choke 30 and channel 27 into lower end of cylinder 5ª at a limited rate and cause piston 4ª to rise at a rate slightly greater than the rate at which piston 4 descends. Consequently, piston 4ª will reach the end of its up stroke before piston 4 reaches the end of its down stroke.

When piston 4ª reaches the end of its up stroke, it will uncover the end of channel 26 and then the liquid supplied to the lower end of cylinder 5ª during continued downward movement of piston 4 flows through channel 26, check valve 25, channels 18 and 23 and check valve 24 into channel 16.

When piston 4 reaches the end of its down stroke, a half cycle of operation has been completed and the machine comes to rest. The second half of the cycle may then be started by causing pump 1 to discharge into channel 16 which will cause the slides to move in the above described manner but in directions opposite to those in which they move during the first half of the cycle.

Pump 1 should deliver liquid to cylinder 5 or 5ª at a rate high enough to enable piston 4 or 4ª to drive slide 3 or 3ª at approximately the highest practical cutting speed of the tool carried thereby. However, cylinder 6 is much smaller than cylinder 5 or 5ª and, if pump 1 should deliver liquid thereto at the rate required to drive piston 4 or 4ª at the desired speed, piston 7 would move slides 2 and 2ª at such high speeds that the advancing slide would strike a damaging blow against the stop which is always employed to accurately determine the broaching position of the work.

It is therefore desirable that the slides be moved at a rapid but regulated speed and, in order that the machine may operate smoothly, it is desirable that the slides be gradually accelerated. This is accomplished by means of a control which will cause the displacement of pump 1 to be varied according to a predetermined schedule.

Any suitable type of pump may be employed but, for the purpose of illustration, pump 1 has been shown as being of the rolling piston type which is fully illustrated and described in Patent No. 2,074,068. It is deemed sufficient to state herein that pump 1 has its pistons and cylinders arranged radially in a cylinder barrel 42 which rotates upon a stationary valve shaft or pintle 43 having formed therein ports and passages through which liquid flows to and from the cylinders, that the outer ends of the pistons react against an annular reaction surface 44 which in practice is formed in a separate rotatable thrust member carried by a slide block 45 but which has been shown as being formed in the slide block 45, that pump 1 will discharge liquid in a direction and at a rate depending upon the direction and the distance the axis of reaction surface 44 is offset from the axis of cylinder barrel 42, and that slide block 45 is arranged in a casing 46 which permits it to be moved transversely of pintle 43 but prevents it from moving in any other direction.

Channels 15 and 16 are connected to pump 1 in communication with the passages formed in pintle 43. If cylinder barrel 42 is rotated in a clockwise direction as viewed in Fig. 1, pump 1 will discharge liquid into channel 15 and have liquid returned to it through channel 16 when slide block 45 is shifted toward the right from its central position, and it will discharge liquid into channel 16 and have liquid returned to it through channel 15 when slide block 45 is shifted toward the left from its central position. When slide block 45 is in its central or neutral position at which time reaction surface 44 is concentric with cylinder barrel 42, pump 1 is at zero stroke and no liquid will be delivered thereby.

In order to compensate for leakage losses and for the difference in the volume delivered by pump 1 and the volume returned thereto from an external circuit having differential motors connected therein, means are provided to permit liquid returned to the pump in excess of pump requirements to be discharged into reservoir 38 and, when the volume returned to the pump is less than pump requirements, to either permit the pump to draw the additional liquid required from reservoir 38 or to be supplied therefrom by a gear pump 50 which has been shown as a separate pump but which is ordinarily driven in unison with the main pump and arranged in the casing thereof according to the common practice.

As shown, communication between pump 1 and reservoir 38 is controlled by an automatic valve 51 having two spaced apart heads or pistons 52 and 53 arranged thereon and closely fitted in a bore 54 formed in a valve casing 55 which is arranged below slide block 45 and has a part thereof extending into the liquid in reservoir 38.

Piston heads 52 and 53 on valve 51 control communication between bore 54 and two channels 56 and 57 which connect channels 15 and 16 with bore 54 at two points spaced from opposite ends thereof. The extreme left end of bore 54 is connected by a channel 58 to channel 56 intermediate the ends thereof and the extreme right end of bore 54 is connected by a channel 59 to channel 57 intermediate the ends thereof.

That part of bore 54 between channels 56 and 57 communicates with a chamber 60 formed in the lower part of valve casing 55 and communicating with reservoir 38 through a check valve 61 which permits pump 1 to draw liquid freely from reservoir 38 but prevents liquid from being expelled from chamber 60 except through a low pressure relief valve 62 having its inlet connected to chamber 60.

Gear pump 50 draws liquid from reservoir 38 and discharges it into a low pressure supply channel 63 having three branches 63ª, 63ᵇ and 63ᶜ. A part of the liquid discharged by gear pump 50 is used for control purposes, as will presently appear, and the remainder is exhausted through a relief valve 64 which has its inlet connected to channel 63ª and its outlet connected to chamber 60 by channel 65.

The liquid discharged by gear pump 50 into chamber 60 in excess of the volume required to supercharge pump 1 is exhausted through relief valve 62 so that, except when pump 1 is drawing liquid from reservoir 38 through check valve 31, gear pump 50 is enabled to maintain in chamber 60 a pressure equal to the resistance of relief valve 62 and to maintain in channel 63 and its branches a pressure equal to the sum of the resistances of relief valves 62 and 64.

The arrangement is such that, when pump 1 starts to deliver liquid into channel 16, pressure extends from channel 16 through channels 57 and 59 to the right end of bore 54 and shifts valve 51 toward the left so that channel 57 is blocked by piston 53 and channel 56 is opened to chamber 60 through bore 54 and, when pump 1 starts to deliver liquid into channel 15, pressure extends from channel 15 through channels 56 and 58 to the left end of bore 54 and shifts valve 51 toward the right to the position shown so that channel 56 is blocked by piston 52 and channel 57 is opened to chamber 60 through bore 54.

Valve 51 thus operates to automatically block the pressure side of the pump from chamber 60 and to open the return side of the pump to chamber 60 in either direction of pump delivery so that pump 1 can at no time discharge freely into reservoir 38, liquid returned to the pump in excess of pump requirements can at all times be discharged through channel 56 or 57, bore 54, chamber 60 and relief valve 62 into reservoir 38, and any deficiency in the liquid returned to the pump from an external circuit can be made up by liquid drawn by pump 1 through check valve 61.

Pump 1 is caused to deliver liquid in one direction or the other by shifting slide block 45 in one direction or the other from a central or neutral position. This is accomplished by hydraulically actuated means operated by liquid supplied thereto from gear pump 50 under the control of a valve which controls the rate, direction and extent of movement of slide block 45.

As shown in Fig. 1, slide block 45 is constantly urged toward the left by a hydraulic servo-motor consisting of a cylinder 70, which is formed integral with or connected to pump casing 46, and a piston 71 which abuts or is connected to the right side of slide block 45 and fitted in cylinder 70. Branch channel 63ª is connected to cylinder 70 so that piston 71 is subjected at all times to gear pump pressure.

Slide block 45 is adapted to be moved toward the right by a hydraulic servo-motor consisting of a piston 72, which has a larger effective pressure area than piston 71 and abuts or is connected to the left side of slide block 45, and a cylinder 73 which is formed integral with or connected to pump casing 46 and has piston 72 fitted therein.

Cylinder 73 is closed at its outer end by a housing 74 having a bore 75 (Fig. 2) formed therein in axial alignment with an axial bore 76 which extends through piston 72 and through an extension or hub 77 formed upon the outer face of piston 72. The inner end of bore 76 communicates at all times with the interior of pump casing 46 as by means of one or more radial passages 78 formed in the inner end of piston 72.

Servomotor 72—73 is controlled by a rotary valve 81 which is fitted in bores 75 and 76 and provided upon its outer end with a pinion 82 for rotating it and for restraining it from axial movement.

Valve 81 is provided with an internal passage 83 having one end thereof in communication at all times with an annular groove 84 which is formed in the wall of bore 75 and has branch channel 63ᵇ connected thereto so that groove 84 and passage 83 are constantly supplied with motive liquid from gear pump 50.

The other end of passage 83 opens into a groove 85 which is formed in the peripheral surface of valve 81 adjacent a port 86 formed in hub 77. Port 86 is adapted, upon rotation of valve 81 in one direction or the other, to provide communication between the interior of cylinder 73 and either groove 85 or a groove 87 which is formed in the peripheral surface of valve 81 and opens into the inner end of bore 76.

The arrangement is such that, when port 86 registers with groove 85, liquid from gear pump 50 will flow through channels 63 and 63$^b$, groove 84, passage 83, groove 85 and port 86 into cylinder 73 and act upon piston 72. Since the effective pressure area of piston 72 is greater than that of piston 71, the liquid entering cylinder 73 will cause piston 72 to move slide block 75 toward the right and piston 71 will expel liquid from cylinder 70 through relief valves 64 and 62. When port 86 registers with groove 87, cylinder 73 is open to drain and the liquid constantly supplied to cylinder 70 will cause piston 71 to move slide block 45 toward the left and cause piston 72 to expel liquid from cylinder 73 through port 86, groove 87, the inner end of bore 76 and passage 78 into pump casing 46.

Port 86 and grooves 85 and 87 are so proportioned that, when 81 is stationary, opposite edges or corners of port 86 aline with adjacent edges of grooves 85 and 87 so that the slightest relative movement between port 86 and grooves 85 and 87 axially of the valve 81 will open communication between port 86 and one or the other of grooves 85 and 87.

Consequently, when valve 81 is stationary, any movement of slide block 45 toward the left will open port 86 to groove 85 and permit liquid to enter cylinder 73 and cause piston 72 to return slide block 45 to its correct position, and any movement of slide block 45 toward the right will open port 86 to groove 87 and permit liquid to escape from cylinder 73 and permit piston 71 to return slide block 45 to its correct position.

Communication between port 86 and one or the other of grooves 85 and 87 may be established by rotating valve 81 in one direction or the other to thereby cause slide block 45 to be moved in one direction or the other. Since port 86 is formed in hub 77 so that it moves with piston 72 and slide block 45, valve 81 and hub 77 constitute a follow-up valve mechanism which permits liquid to flow to and from cylinder 73 only while valve 81 is rotating. Consequently, movement of slide block 45 ceases at substantially the same instant that valve 81 ceases to rotate.

If grooves 85 and 87 were spiral, slide block 45 would be moved through a distance proportional to the angular distance through which valve 81 was rotated, and it would be moved at a rate determined by the pitch of grooves 85 and 87 and by the rate at which valve 81 was rotated. Therefore, if grooves 85 and 87 were spiral and valve 81 were rotated at a uniform rate, the volumetric delivery of pump 1 would be uniformly varied if the hydrodynamic machine were functioning as a pump or the motor speed would be uniformly varied if the hydrodynamic machine were functioning as a motor.

In the illustration, it is desired to operate motor 6—7 at a predetermined speed until it has completed its stroke and to then operate motors 4—5 and 4$^a$—5$^a$ at a predetermined speed. This is accomplished by so forming grooves 85 and 87 that the contours of their adjacent edges correspond to the functions desired. Since the pump chosen for illustration is reversible, grooves 85 and 87 extend around valve 81 in both directions from a line extending axially through port 83 which line may be considered as the centerline of the valve.

In the illustration given, each hydraulic motor should be operated at the same speed in both directions so that the volumetric delivery of pump 1 should be varied in both directions according to the same schedule. Consequently, grooves 85 and 87 are shown as being substantially the same but opposite hand to each other with the exception that the inner or right hand end of groove 87 is open to the inner end of bore 76 while the corresponding end of groove 85 is closed.

Since with the above exception grooves 85 and 86 are substantially opposite hand to each other, a description of one will suffice for both. Consequently, each edge portion of each groove has been indicated by a reference character consisting of the reference numeral of the groove with an exponent added thereto and corresponding portions of the two grooves indicated by corresponding exponents.

As shown in Figs. 3 to 5, the edge of groove 85 adjacent groove 87 has a straight portion 85$^a$ which extends circumferentially in both directions from the centerline of valve 81. One end of edge portion 85$^a$ joins one end of a spiral portion 85$^b$ the other end of which joins one end of the far edge 85$^c$ of groove 85.

The other end of straight portion 85$^a$ joins one end of a short spiral portion 85$^d$ the other end of which joins one end of a short straight or circumferential portion 85$^e$. The other end of straight portion 85$^e$ joins one end of a short spiral portion 85$^f$ the other end of which joins one end of a longer circumferential portion 85$^g$. The other end of circumferential portion 85$^g$ joins a spiral portion 85$^h$ the other end of which is joined to the other end of far edge 85$^c$ by an edge portion 85$^k$.

As explained above, groove 87 is substantially opposite hand to 85 except that its inner end is open to the inner end of bore 76. Instead of edge portions 87$^b$ and 87$^c$ being joined to each other as is the case with the corresponding edge portions of groove 85, they extend to the end of valve 81 to thereby open the inner end of groove 87 to the inner end of bore 76.

When valve 81 is in its central or neutral position as shown in Fig. 3, edge portions 85$^e$ and 87$^e$ are in alinement with opposite edges of port 86 and slide block 45 is in its neutral position so that no liquid will be delivered by pump 1. When valve 81 is rotated in one direction or the other, an edge portion of one or the other of grooves 85 and 87 will overlap one or the other edges or corners of port 86 to permit liquid to flow to or from cylinder 73 and thereby cause slide block 45 to be shifted in one direction or the other.

Valve 81 is rotated by means of the pinion 82 fixed thereto. As shown, pinion 82 meshes with a rack 88 formed on a piston or plunger 89 which is closely fitted in a bore 90 formed in the outer part of housing 74. Bore 90 communicates at the opposite end thereof with two pressure chambers 91$^r$ and 91$^L$ (Fig. 6) which are also formed in housing 74.

Plunger 89 is the same length as bore 90 and is urged towards its central or neutral position by two springs 92$^R$ and 92$^L$ arranged, respectively, in pressure chambers 91$^R$ and 91$^L$ with the outer ends thereof in engagement with the outer ends of the chambers and the inner ends thereof in engagement, respectively, with two spring retainers 93$^R$ and 93$^L$ which engage opposite ends of plunger 89.

Spring retainers 93$^R$ and 93$^L$ are supported, respectively, upon two small diameter stops 94$^R$ and 94$^L$ which are fixed to or formed upon opposite ends of plunger 89 and extend through the spring retainers to limit the movement of plunger 89 in each direction.

When liquid under pressure enters one or the other of chambers 91$^R$ and 91$^L$, it will act upon an end of plunger 89 and shift it in one direction or the other and thereby cause rack 88 and pinion 82 to rotate valve 81 in one direction or the other. When the chamber to which pressure liquid has been supplied is opened to drain, the spring in the opposite chamber will move plunger 89 to its central position and thereby cause rack 88 and pinion 82 to rotate valve 81 to its neutral position.

Plunger 89 is adapted to be shifted in one direction or the other by liquid supplied by gear pump 50 to one or the other of pressure chambers 91$^R$ and 91$^L$. The rate at which plunger 89 is shifted is controlled by an adjustable choke 95 (Fig. 6) and the direction in which plunger 89 is shifted is controlled by a valve 96 fitted in bore 97 of a valve casing 98.

Choke 95 has its inlet connected to branch 63$^c$ of gear pump supply channel 63 and its outlet connected by a channel 99 to an annular groove or port 100 which is formed in the wall of bore 97 between two similarly formed annular grooves or ports 101 and 102 which are spaced therefrom and from the ends of bore 97 and connected, respectively, by channels 103 and 104 to pressure chambers 91$^R$ and 91$^L$ so that liquid from gear pump 50 may flow at a limited rate to one or the other of chambers 91$^R$ and 91$^L$ depending upon the position of valve 96.

In order that liquid may escape from the pressure chambers, both ends of bore 97 are connected to a drain channel 105 which discharges into reservoir 38, and valve 96 controls communication between each of ports 101 and 102 and the adjacent end of bore 97.

Valve 96 may be shifted in any desired manner but ordinarily a control element is manually operated to cause valve 96 to be shifted from the neutral position shown in Fig. 6 to the position shown in Fig. 8 or to the position shown in Fig. 9 to thereby initiate a cycle of operation, and it is ordinarily returned to its neutral position automatically at the end of the cycle such as when tool slides 3 and 3$^a$ reach the ends of their strokes.

Operation

When valve 96 is in its central or neutral position as shown in Fig. 6, pressure chambers 94$^R$ and 94$^L$ are open to drain and plunger 89 is held in its central or neutral position by springs 92$^R$ and 92$^L$. When plunger 89 is in its neutral position, valve 81 is in its neutral position with edge portions 85$^e$ and 87$^e$ of grooves 85 and 87 in alinement with opposite edges of port 86, as shown in Fig. 3, and slide block 45 will be in its central or neutral position as shown in Fig. 1 so that pump 1 will be at zero stroke and no liquid will be discharged thereby.

When valve 96 is shifted toward the right to the position shown in Fig. 8, liquid from gear pump 50 (Fig. 1) may flow through channel 63, branch 63$^c$, choke 95 (Fig. 6), channel 99, bore 97 and channel 104 to pressure chamber 91$^L$ and cause plunger 89 to move toward the right and expel liquid from chamber 91$^R$ through channel 103 and bore 97 into drain channel 105. Choke 95 will restrict the flow of liquid and thereby cause plunger 89 to move at a very slow uniform rate.

Movement of plunger 89 toward the right causes rack 88 to rotate pinion 82 and valve 81 in a counterclockwise direction in respect to Fig. 6, thereby causing the adjacent edges of grooves 85 and 87 to move along the opposite edges of port 86.

During rotation of valve 81 through the first few degrees, straight portions 85$^e$ and 87$^e$ will remain in alinement with the edges of port 86 and slide block 45 will remain stationary but, as soon as spiral edge portion 85$^f$ overlaps the corner of port 86 as shown in Fig. 4, gear pump liquid will enter cylinder 73 (Fig. 2) and cause piston 72 to move slide block 45 toward the right, thereby causing pump 1 to deliver liquid through channel 15 (Fig. 6) to the left end of cylinder 6.

During the time that edge portion 85$^f$ overlaps the corner of port 86, gear pump liquid will continue to flow into cylinder 73 and cause piston 72 to move slide block 45 toward the right at a rate dependent upon the speed of plunger 89 and the pitch of edge portion 85$^f$.

When the end of edge portion 85$^f$ passes the corner of port 86, circumferential edge portion 85$^g$ will aline with one edge of port 86 and circumferential edge portion 87$^a$ will aline with the other edge of port 86 so that no liquid can flow to or escape from cylinder 73. Then during continued rotation of valve 81, slide block 45 will remain stationary and pump 1 will deliver liquid through channel 15 to cylinder 6 at a desired rate which is proportional to the distance edge portion 85$^g$ is spaced from edge portion 85$^e$ axially of valve 81.

The volumetric delivery of pump 1 is thus gradually increased from zero to a desired rate so that the liquid delivered by pump 1 through channel 15 to the left end of cylinder 6 will move piston 7 toward the right and gradually accelerate it from a stationary position to a desired speed and then move it at that speed to the end of its stroke.

Choke 95 is ordinarily adjusted to so regulate the speed of plunger 89 that the end of circumferential edge portion 85$^g$ will pass the corner of port 86 and spiral edge portion 85$^h$ will start to overlap the corner of port 86 at approximately the same time that piston 7 reaches the end of its stroke and uncovers the end of channel 17 so that the liquid discharged by pump 1 will flow therethrough to the upper end of cylinder 5 and move piston 4 downward.

As soon as spiral edge portion 85$^h$ overlaps the corner of port 86, gear pump liquid will enter cylinder 73 and cause piston 72 to move slide block 45 farther toward the right at a rate dependent upon the speed of plunger 89 and the pitch of edge portion 85$^h$, thereby causing the volumetric delivery of pump 1 to be gradually increased with the result that piston 4 is gradually accelerated.

Plunger 89 will continue to rotate valve 81 and thereby cause the displacement of pump 1 and the speed of piston 4 to be gradually increased until further movement of plunger 89 is arrested by stop 94$^R$ at which time port 86 will move out of communication with groove 85 so that slide block 45 will become stationary and pump 1 will continue to discharge liquid at a predetermined rate to thereby cause piston 4 to move at a desired speed as long as valve 81 remains stationary.

The liquid expelled from the lower end of cylinder 5 by piston 4 during its downward movement flows through channel 27 to the lower end of cylinder 5ª and causes piston 4ª to raise slide 3ª as previously explained.

When piston 4 reaches the end of its down stroke, valve 96 is automatically shifted in any suitable manner from the position shown in Fig. 8 to the position shown in Fig. 6 in which position of valve 96 channel 104 is open to drain channel 105 so that spring 92ʀ will quickly shift plunger 89 to its neutral position and thereby cause rack 88 and pinion 82 to rotate valve 81 clockwise to its neutral position.

As soon as valve 81 starts to rotate in a clockwise direction, edge portion 87ᵇ overlaps the corner of port 86 so that liquid can escape from cylinder 73 and piston 71 can move slide block 45 toward the left to reduce the displacement of pump 1.

During continued rotation of valve 81, edge portions 87ᵇ, 87ª and 87ᵈ will successively overlap a corner or edge of port 86 and slide block 45 will continue to move rapidly toward the left until valve 81 stops in a neutral position at which time edge portions 85ᵉ and 87ᵉ will be in alinement with opposite edges of port 86, as shown in Fig. 3, and slide block 45 will come to rest in its neutral or zero stroke position. The broaching machine has then completed a half cycle of operation.

The second half of a cycle of operation may be initiated by shifting valve 96 toward the left to the position shown in Fig. 9. With valve 96 in that position, liquid from gear pump 50 may flow to channel 63, branch 63ª, choke 95, channel 99, bore 97 and channel 103 to pressure chamber 91ʀ and cause plunger 89 to move toward the left and expel liquid from chamber 91ᴸ through channel 104 and bore 97 into drain channel 105. Choke 95 will restrict the flow of liquid and thereby cause plunger 89 to move at a very slow uniform rate.

Movement of plunger 89 toward the left causes rack 88 to rotate pinion 82 and valve 81 in a clockwise direction in respect to Fig. 6, thereby causing the adjacent edges of grooves 85 and 87 to move along the opposite edges of port 86.

During rotation of valve 81 through the first few degrees, straight portions 85ᵉ and 87ᵉ will remain in alinement with the edges of port 86 and slide block 45 will remain stationary but, as soon as spiral edge portion 87ᶠ overlaps the corner of port 86, liquid can escape from cylinder 73 and piston 71 will move slide block 45 toward the left and thereby cause pump 1 to deliver liquid through channel 16 to the right end of cylinder 6.

During continued rotation of valve 81, spiral edge portion 87ᶠ will at first overlap the corner of port 86 so that slide block 45 will continue to move toward the left through a predetermined distance, then straight edge portion 87ᵍ will aline with the edge of port 86 so that slide block 45 will remain stationary for a predetermined interval of time, and then edge portion 87ʰ will overlap the corner of port 86 as shown in Fig. 5 so that slide block 45 will be moved farther toward the left to a predetermined point.

The volumetric delivery of pump 1 is thus gradually increased from zero to a predetermined amount, then maintained at that amount for a predetermined interval of time, then gradually increased to a predetermined maximum, and then maintained at that maximum until valve 81 is returned to its neutral position.

Consequently, the liquid discharged by pump 1 will enter the right end of cylinder 6 and gradually accelerate piston 7 from a stationary position to a predetermined speed, then move it at that speed to the end of its stroke, then flow through channel 18 to the upper end of cylinder 5ª and move piston 4ª downward at a speed which gradually increases from a slow speed to a high speed and then remains constant until piston 4ª reaches the end of its down stroke at which time valve 96 automatically returns to its neutral position to cause pump displacement to be reduced to zero and the machine brought to rest as previously explained.

The apparatus described herein is susceptible of various modifications and adaptations without departing from the scope of the invention as hereinafter claimed.

The invention is hereby claimed as follows:

1. A control, comprising a stationary cylinder, a piston fitted in said cylinder, means for supplying motive liquid to said cylinder to move said piston, valve mechanism for controlling the flow of liquid to and from said cylinder, and means for operating said valve mechanism at a uniform rate, said valve mechanism having cooperating ports and passages so arranged as to vary the flow of liquid to and from said cylinder according to a predetermined schedule and thereby cause the movement of said piston to be varied according to said schedule during operation of said valve mechanism at said uniform rate.

2. A control, comprising a hydraulic motor for moving a member, means for supplying motive liquid to said motor to energize the same, a follow-up valve mechanism for controlling the flow of liquid to and from said motor and having one part thereof movable with said member and another part thereof independently movable whereby liquid may flow to or from said motor only during movement of said independently movable valve part, and means for moving said independently movable valve part at a uniform rate, said valve parts having cooperating ports and passages so arranged as to vary the flow of liquid to and from said motor according to a predetermined schedule and thereby cause said member to be moved according to said schedule during movement of said independently movable valve part at said uniform rate.

3. A control, comprising a hydraulic motor for moving a member, means for supplying motive liquid to said motor to energize the same, a follow-up valve mechanism for controlling the flow of liquid to and from said motor and including two valve parts one of which is rotatable and the other of which is movable with said member axially of said rotatable part, and means for rotating said rotatable part at a uniform rate, said valve parts being fitted one within the other and having cooperating ports and passages so arranged as to vary the flow of liquid to and from said motor according to a predetermined schedule and thereby cause said member to be moved according to said schedule during rotation of said rotatable part at said uniform rate.

4. A control, comprising a hydraulic motor for moving a member, means for supplying motive liquid to said motor to energize the same, a follow-up valve mechanism for controlling the flow of liquid to and from said motor and having one part thereof movable with said member and another part thereof independently movable whereby liquid may flow to or from said motor only during movement of said independently movable valve part, hydraulic servo-motor means for moving said independently movable valve part at a uniform rate, and means for supplying motive liquid to said servo-motor means including a choke for restricting the flow of liquid thereto to thereby regulate the speed thereof and a reversing valve for controlling the operation of said servo-motor means, said valve parts having cooperating ports and passages so arranged as to vary the flow of liquid to and from said motor according to a predetermined schedule and thereby cause said member to be moved according to said schedule during movement of said independently movable valve part at said uniform rate.

5. A control, comprising a hydraulic motor for moving a member, means for supplying motive liquid to said motor to energize the same, a follow-up valve mechanism for controlling the flow of liquid to and from said motor and including two valve parts one of which is rotatable and the other of which is movable with said member axially of said rotatable part, hydraulic servo-motor means for rotating said rotatable part at a uniform rate, and means for supplying motive liquid to said servo-motor means including a choke for restricting the flow of liquid thereto to thereby regulate the speed thereof and a reversing valve for controlling the operation of said servo-motor means, said valve parts being fitted one within the other and having cooperating ports and passages so arranged as to vary the flow of liquid to and from said motor according to a predetermined schedule and thereby cause said member to be moved according to said schedule during rotation of said rotatable part at said uniform rate.

6. A control, comprising a hydraulic motor for moving a member, a source of pressure liquid, means for supplying liquid from said source to said motor to energize the same, and means for controlling the flow of liquid to and from said motor including a valve cylinder movable with said member, a rotary valve fitted in said cylinder and forming therewith a follow-up valve mechanism, said cylinder and valve having cooperating ports and passages so arranged that liquid may flow through said valve mechanism during rotation of said valve through a certain part of its range and be prevented from flowing therethrough during rotation of said valve through a different part of its range, and means for rotating said valve.

7. A control, comprising a hydraulic motor for moving a member, a source of pressure liquid, means for supplying liquid from said source to said motor to energize the same, and means for controlling the flow of liquid to and from said motor including a valve cylinder movable with said member, a rotary valve fitted in said cylinder and forming therewith a follow-up valve mechanism, said cylinder and valve having cooperating ports and passages so arranged that liquid may flow through said valve mechanism during rotation of said valve through a certain part of its range and be prevented from flowing therethrough during rotation of said valve through a different part of its range, means including a hydraulic servo-motor for rotating said valve, means for supplying motive liquid to said servo-motor, a valve for controlling said servo-motor, and means for regulating the flow of liquid to said servo-motor to thereby regulate the speed of said rotary valve.

8. A control, comprising a hydraulic motor for moving a member, a source of pressure liquid, means for supplying liquid from said source to said motor to energize the same, and means for controlling the flow of liquid to and from said motor including a valve cylinder movable with said member, a rotary valve fitted in said cylinder and forming therewith a follow-up valve mechanism, said cylinder and valve having cooperating ports and passages so arranged that liquid may flow through said valve mechanism during rotation of said valve through a certain part of its range and be prevented from flowing therethrough during rotation of said valve through a different part of its range, means including a hydraulic servo-motor for rotating said valve, means for supplying motive liquid to said servo-motor, means for regulating the flow of liquid to said servo-motor to thereby regulate the rotary speed of said valve, a control valve operable either to direct said liquid to said servo-motor or to connect said servo-motor to drain to thereby either energize or deenergize said servo-motor, and spring means for causing said valve rotating means to rotate said rotary valve to a neutral position upon said servo-motor being deenergized.

9. A control, comprising a hydraulic motor for moving a member, a source of pressure liquid, means for supplying liquid from said source to said motor to energize the same, and means for controlling the flow of liquid to and from said motor including a valve cylinder movable with said member and having a port through which liquid may flow to and from said motor, a rotary valve fitted in said cylinder and having formed in its peripheral surface two spaced apart grooves one of which is connected to said source and the other of which is connected to drain, said grooves extending diagonally around said valve upon opposite sides of said port with the adjacent edges of said grooves normally in alinement with opposite edges of said port whereby rotation of said valve in one direction or the other causes one or the other of said grooves to communicate with said port to permit liquid to flow to or from said motor and thereby cause said motor to shift said member in one direction or the other, a stationary cylinder, a plunger fitted in said cylinder and provided with a rack, a pinion meshing with said rack and fixed to said valve to rotate it during movement of said plunger, spring means for retaining said plunger in a neutral position, means for supplying liquid to said cylinder to cause said plunger to move from its neutral position, means for regulating the flow of liquid to said cylinder to thereby regulate the speed of said plunger, and a valve for either directing said liquid to said cylinder to cause said plunger to be moved at a regulated rate or for connecting said cylinder to drain to thereby permit said spring means to return said plunger at high speed to its neutral position.

10. A control, comprising a hydraulic motor for moving a member, a source of pressure liquid, means for supplying liquid from said source to said motor to energize the same, and means for controlling the flow of liquid to and from said motor including a valve cylinder movable with said member and having a port through which liquid may flow to and from said motor, a rotary valve fitted in said cylinder and having formed in its peripheral surface two spaced apart grooves one of which is connected to said source and the other of which is connected to drain whereby communication between said port and one or the other of said grooves permits liquid to flow to or from said motor and cause said motor to shift said member in one direction or the other, said grooves being arranged upon opposite sides of said port with the adjacent edges thereof normally in alinement with opposite edges of said port and each of the adjacent edges of said grooves consisting of alternate circumferential and spiral portions whereby a spiral edge portion of one or the other of said grooves will overlap the adjacent edge of said port and cause that groove to communicate with said port during one part of the rotary movement of said valve and circumferential edge portions to aline with opposite edges of said port during another part of the rotary movement of said valve, and means for rotating said valve.

11. A control, comprising a hydraulic motor for moving a member, a source of pressure liquid, means for supplying liquid from said source to said motor to energize the same, and means for controlling the flow of liquid to and from said motor including a valve cylinder movable with said member and having a port through which liquid may flow to and from said motor, a rotary valve fitted in said cylinder and having formed in its peripheral surface two spaced apart grooves one of which is connected to said source and the other of which is connected to drain whereby communication between said port and one or the other of said grooves permits liquid to flow to or from said motor and cause said motor to shift said member in one direction or the other, said grooves being arranged upon opposite sides of said port with the adjacent edges thereof normally in alinement with opposite edges of said port and each of the adjacent edges of said grooves consisting of alternate circumferential and spiral portions whereby a spiral edge portion of one or the other of said grooves will overlap the adjacent edge of said port and cause that groove to communicate with said port during one part of the rotary movement of said valve and circumferential edge portions to aline with opposite edges of said port during another part of the rotary movement of said valve, means for rotating said valve, and means for controlling said valve rotating means to thereby regulate the speed of said valve.

12. A control, comprising a hydraulic motor for moving a member, a source of pressure liquid, means for supplying liquid from said source to said motor to energize the same, and means for controlling the flow of liquid to and from said motor including a valve cylinder movable with said member and having a port through which liquid may flow to and from said motor, a rotary valve fitted in said cylinder and having formed in its peripheral surface two spaced apart grooves one of which is connected to said source and the other of which is connected to drain whereby communication between said port and one or the other of said grooves permits liquid to flow to or from said motor and cause said motor to shift said member in one direction or the other, said grooves being arranged upon opposite sides of said port with the adjacent edges thereof normally in alinement with opposite edges of said port and each of the adjacent edges of said grooves consisting of alternate circumferential and spiral portions whereby a spiral edge portion of one or the other of said grooves will overlap the adjacent edge of said port and cause that groove to communicate with said port during one part of the rotary movement of said valve and circumferential edge portions to aline with opposite edges of said port during another part of the rotary movement of said valve, servo-motor means for rotating said valve, means for energizing said servo-motor means, and means for controlling the speed of said servo-motor means to thereby control the rate at which said member is shifted.

13. A control, comprising a hydraulic motor for moving a member, a source of pressure liquid, means for supplying liquid from said source to said motor to energize the same, and means for controlling the flow of liquid to and from said motor including a valve cylinder movable with said member and having a port through which liquid may flow to and from said motor, a rotary valve fitted in said cylinder and having formed in its peripheral surface two spaced apart grooves one of which is connected to said source and the other of which is connected to drain whereby communication between said port and one or the other of said grooves permits liquid to flow to or from said motor and cause said motor to shift said member in one direction or the other, said grooves being arranged upon opposite sides of said port with the adjacent edges thereof normally in alinement with opposite edges of said port and each of the adjacent edges of said grooves consisting of alternate circumferential and spiral portions whereby a spiral edge portion of one or the other of said grooves will overlap the adjacent edge of said port and cause that groove to communicate with said port during one part of the rotary movement of said valve and circumferential edge portions to aline with opposite edges of said port during another part of the rotary movement of said valve, means including a hydraulic servo-motor for rotating said valve, means for supplying motive liquid to said servo-motor, a valve for controlling said servo-motor, and means for regulating the flow of liquid to said servo-motor to thereby regulate the speed of said rotary valve.

14. A control, comprising a hydraulic motor for moving a member, a source of pressure liquid, means for supplying liquid from said source to said motor to energize the same, and means for controlling the flow of liquid to and from said motor including a valve cylinder movable with said member and having a port through which liquid may flow to and from said motor, a rotary valve fitted in said cylinder and having formed in its peripheral surface two spaced apart grooves one of which is connected to said source and the other of which is connected to drain whereby communication between said port and one or the other of said grooves permits liquid to flow to or from said motor and cause said motor to shift said member in one direction or the other, said grooves being arranged upon opposite sides of said port with the adjacent edges thereof normally in alinement with opposite edges of said port and each of the adjacent edges of said grooves consisting of alternate circumferential and spiral portions whereby a spiral edge portion of one or the other of said grooves will overlap the adjacent edge of said port and cause that groove to communicate with said port during one part of the rotary movement of said valve and circumferential edge portions to aline with opposite edges of said port during another part of the rotary movement of said valve, means including a hydraulic servo-motor for rotating said valve, means for supplying motive liquid to said servo-motor, means for regulating the flow of liquid to said servo-motor to thereby regulate the rotary speed of said valve, a control valve operable either to direct said liquid to said servo-motor or to connect said servo-motor to drain to thereby either energize or deenergize said servo-motor, and spring means for causing said valve rotating means to rotate said rotary valve to a neutral position upon said servo-motor being deenergized.

15. A control, comprising a hydraulic motor for moving a member, a source of pressure liquid, means for supplying liquid from said source to said motor to energize the same, and means for controlling the flow of liquid to and from said motor including a valve cylinder movable with said member and having port through which liquid may flow to and from said motor, a rotary valve fitted in said cylinder and having formed in its peripheral surface two spaced apart grooves one of which is connected to said source and the other of which is connected to drain whereby communication between said port and one or the other of said grooves permits liquid to flow to or from said motor and cause said motor to shift said member in one direction or the other, said grooves being arranged upon opposite sides of said port with the adjacent edges thereof normally in alinement with opposite edges of said port and each of the adjacent edges of said grooves consisting of alternate circumferential and spiral portions whereby a spiral edge portion of one or the other of said grooves will overlap the adjacent edge of said port and cause that groove to communicate with said port during one part of the rotary movement of said valve and circumferential edge portions to aline with opposite edges of said port during another part of the rotary movement of said valve, a stationary cylinder, a plunger fitted in said cylinder and provided with a rack, a pinion meshing with said rack and fixed to said valve to rotate it during movement of said plunger, spring means for retaining said plunger in a neutral position, means for supplying liquid to said cylinder to cause said plunger to move from its neutral position, means for regulating the flow of liquid to said cylinder to thereby regulate the speed of said plunger, and a valve for either directing said liquid to said cylinder to cause said plunger to be moved at a regulated rate or for connecting said cylinder to drain to thereby permit said spring means to return said plunger at high speed to its neutral position.

16. The combination, with a stationary cylinder, a piston fitted in said cylinder and constantly urged in one direction, means for supplying to said cylinder motive liquid for moving said piston in the opposite direction, a valve casing carried by said piston, a rotary valve fitted in said casing and in the end portion of said cylinder for controlling the flow of liquid to and from said cylinder to thereby control the movement of said piston, and means for rotating said valve in one direction or the other at a uniform rate, said valve and said casing having cooperating ports and passages so arranged as to vary the flow of liquid to or from said cylinder according to a predetermined schedule but at a non-uniform rate during rotation of said valve at said uniform rate to thereby cause said piston to be moved according to said schedule.

17. The combination, with a stationary cylinder, a piston fitted in said cylinder and constantly urged in one direction, means for supplying to said cylinder motive liquid for moving said piston in the opposite direction, a valve casing carried by said piston, a rotary valve fitted in said casing and in the end portion of said cylinder for controlling the flow of liquid to and from said cylinder to thereby control the movement of said piston, and means for rotating said valve in one direction or the other at a uniform rate, said valve and said casing having cooperating ports and passages so arranged as to cause an intermittent flow of liquid to or from said cylinder during rotation of said valve at said uniform rate to thereby cause said piston to be moved intermittently.

18. The combination, with a stationary cylinder, a piston fitted in said cylinder and constantly urged in one direction, means for supplying to said cylinder motive liquid for moving said piston in the opposite direction, a valve casing carried by said piston, a rotary valve fitted in said casing and in the end portion of said cylinder for controlling the flow of liquid to and from said cylinder to thereby control the movement of said piston, a gear fixed upon said valve, a rack meshing with said gear, hydraulic servo-motor means for reciprocating said rack to thereby rotate said valve, and means for supplying pressure liquid at a uniform rate to one end or the other of said servo-motor means to energize the same and thereby cause said servo-motor means to rotate said valve in one direction or the other at a uniform rate, said valve and said casing having cooperating ports and passages so arranged as to cause an intermittent flow of liquid to or from said cylinder during rotation of said valve at said uniform rate to thereby cause said piston to be moved intermittently.

19. The combination, with a stationary cylinder, a piston fitted in said cylinder and constantly urged in one direction and adapted to be moved in the opposite direction by liquid supplied to said cylinder, a valve casing carried by said piston and having a port for directing liquid to and from said cylinder, a rotary valve fitted in said casing and in the end portion of said cylinder and provided with a passage, means for supplying motive liquid to said passage, said valve having formed in the peripheral surface thereof upon opposite sides of said port two grooves one of which communicates with said passage and the other of which is connected to a drain, the adjacent edges of said grooves being normally in alinement with opposite edges of said port and each consisting of alternate spiral and circumferential portions so arranged that rotation of said valve at a uniform rate in one direction or the other will permit liquid to flow to or from said cylinder according to a predetermined schedule and cause said piston to be moved in one direction or the other according to said schedule, and means for rotating said valve in one direction or the other at a uniform rate.

20. The combination, with a stationary cylinder, a piston fitted in said cylinder and constantly urged in one direction and adapted to be moved in the opposite direction by liquid supplied to said cylinder, a valve casing carried by said piston and having a port for directing liquid to and from said cylinder, a rotary valve fitted in said casing and in the end portion of said cylinder and provided with a passage, means for supplying motive liquid to said passage, said valve having formed in the peripheral surface thereof upon opposite sides of said port two grooves one of which communicates with said passage and the other of which is connected to a drain, the adjacent edges of said grooves being normally in alinement with opposite edges of said port and each consisting of alternate spiral and circumferential portions so arranged that rotation of said valve at a uniform rate in one direction or the other will permit liquid to flow to or from said cylinder according to a predetermined schedule and cause said piston to be moved in one direction or the other according to said schedule, a gear fixed upon said valve, a rack meshing with said gear, hydraulic servo-motor means for reciprocating said rack to thereby rotate said valve, and means for supplying pressure liquid at a uniform rate to one end or the other of said servo-motor means to energize the same and thereby cause said servo-motor means to rotate said valve in one direction or the other at a uniform rate.

ERNST WIEDMANN.